United States Patent [19]

Wolf

[11] Patent Number: 4,818,396
[45] Date of Patent: Apr. 4, 1989

[54] DEVICE FOR A FILTER

[76] Inventor: Joachim Wolf, Malmsheimer Str. 67, 7252 Weil der Stadt, Fed. Rep. of Germany

[21] Appl. No.: 192,726

[22] Filed: May 11, 1988

[51] Int. Cl.[4] ............................................. B01D 46/00
[52] U.S. Cl. ................................ 210/232; 210/323.2; 55/350; 55/484
[58] Field of Search ............... 55/350, 484; 210/323.2, 210/232, 234

[56] References Cited

FOREIGN PATENT DOCUMENTS 3520139 12/1986 Fed. Rep. of Germany .

*Primary Examiner*—Bernard Nozick

[57] ABSTRACT

A device for a filter has a filter pot, an adapter arranged to have filter cartridges hanging therefrom, a media-tight foil bag surrounding the filter cartridges and abutting at least indirectly in the filter pot, a head arranged above the adapter, a sealing device arranged between the upper edge of the filter pot and the outer marginal zone of the adapter, outflow volume means between the adapter and the head, a lid arranged to fit upon the pot and the sealing device, an elastic feed connector extending upwards from the head and communicating with the interior of the foil bag, and an elastic outflow connector extending upwards from the head and communicating with the outflow volume means, the lid having openings through which the feed and outflow connectors pass. First and second vertical cylindrical enclosing connector pipes, each with an inner surface which can be subjected to circumferential stresses, extend from the lid. The feed connector is arranged to fit in the first enclosing connector pipe and the outflow connector is arranged to fit in the second enclosing connector pipe. A hollow cone is arranged at the end of each of the conduits, which is subjectable to pressure stresses and has an external circumferential surface that is a steep cylinder-cone frustum that fits in its narrower zone into the feed and outflow connectors, respectively. An axially acting clamping device is arranged between each of the hollow cones and respective ones of the enclosing connector pipes.

12 Claims, 2 Drawing Sheets

DEVICE FOR A FILTER

The invention relates to a device for a filter adapted to be connected to a plurality of conduits.

BACKGROUND OF THE INVENTION AND RELEVANT PRIOR ART

Such filters are known from German OS No. 3,520,139. The media which may be seen on page 5, paragraph 1 thereof can be filtered therewith. The working pressures lie between 5 and 16 bars and mainly between 6 and 10 rs. When such a filter is exhausted, the following procedure is adopted: Upstream of the feed connector and downstream of the outflow connector a shut-off element is provided which is arranged close to the feed connector and the outflow connector respectively. Thus the filter is isolated from the pressure in the further conduits. Now the further conduits are unscrewed from the feed connector and outflow connector respectively, the lid is opened and the filter is taken out. Then however fluid from the spaces between the feed connector and the preceding shut-off element and between the outflow connector and the subsequent shut-off element comes out and flows on to the lid. According to the fluid, this is irksome and/or dangerous. To this extent the exchange always involves cleaning work. Moreover, in the end zone of the outflow connector and of the feed connector seals are needed, for example in the form of O-rings with their countersurfaces and groove incisions holding the O-rings.

OBJECT AND STATEMENT OF THE INVENTION

It is the object of the invention to provide a device which eliminates these disadvantages.

Devices of the relevant prior art include:

A filter pot with an upper edge.

An adapter with an outer marginal zone, arranged to have filter cartridges hanging therefrom.

A media-tight foil bag surrounding the filter cartridges and abutting at least indirectly in the filter pot.

A head arranged above the adapter.

A sealing device arranged between the upper edge of the filter pot and the outer marginal zone of the adapter.

Outflow volume means between the adapter and the head.

A lid arranged to fit upon the pot and the sealing device.

An elastic feed connector extending upwards from the head and communicating with the outflow volume means. And the lid has openings through which the feed and outflow connectors pass.

The object of the invention is achieved by the following features:

(a) First and second vertical cylindrical enclosing connector pipes, each with an inner surface which can be subjected to circumferential stresses, extend from the lid, (b) The feed connector is arranged to fit in the first enclosing connector pipe and the outflow connector is arranged to fit in the second enclosing connector pipe, (c) A hollow cone is arranged at the end of each of the conduits, which is suitable to pressure stresses and has an external circumferential surface that is a steep cylinder-cone frustum that fits in its narrower zone into the feed and outflow connectors, respectively, (d) An axially acting clamping device is arranged between each of the hollow cones and respective ones of the enclosing connector pipes, (e) The feed connector and the outflow connector each have an inner surface and an upper marginal zone that is adapted to be widened so far by the hollow cone that the upper marginal zone abuts in respective ones of the enclosing connector pipes, and (f) Clamping devices are arranged to apply a force that is at least great enough to tighten the area between the hollow cones and the inner surfaces at the upper marginal zones of the feed connector and the outflow connector to a working pressure of the filter.

It has in fact appeared that in the opening of the lid the air unavoidably present between the foil bag and the pot escapes, the volume of the filter bag becomes greater by this escaping volume and therefore the medium present below the shut-off elements can fall down and then the fluid level is in no case higher than the upper end of the outflow connector or feed connector. Therefore no soiling and no outflow occur in this region. At the worst the hollow cone and perhaps also the clamping device must be wiped.

The described embodiment includes the following additional advantageous features:

The enclosing connector pipes are of metal. The enclosing connector piece for the one part does not yield circumferentially and for the other part can nevertheless be made relatively thin, which saves material.

The feed connector is of synthetic plastic material. It is possible to exploit the elasticity present in the synthetic plastic material, which is greater than that of metal. Moreover, synthetic plastic material adapts itself better to sealing contours, and also it is not so costly as metal for example.

The feed connector is produced by injection molding. The surfaces which must fit can be produced more precisely than would be the case for example with the blow-molding method. Mutually opposite surfaces can also easily be produced here with accurate dimensions, which is not possible, or in any case not readily possible, by the blow-molding method. High-pressure thermoplastic or high-pressure thermosetting plastic material can be used.

Inner surfaces in the upper marginal zones of the enclosing connector pipes are very steep circular-conical surfaces. It is possible to convert the force of the clamping device simply into sealing force.

The possibility of burrs protruding too far or of protruding small particles being entrained in the introduction of the hollow cone and then coming to lie in the sealing surface in an unfavorable manner is avoided when the feed and outflow connectors have end faces that are rounded.

The enclosing connector pipe associated with the feed connector has an end face, and the end face of the feed connector extends at most to the end face of the enclosing connector pipe. The important sealing points and force take-up points of the synthetic plastic material is not over-stretched and is stretched only as far as permitted by the internal contou—permitted by the designer—of the enclosing connector pieces.

In their unwidened condition, the upper marginal zones of the feed and outflow connectors rest on the inner surfaces of respective ones of the enclosing connector pipes. The material can abut in the end region of the feed connector and outflow connector right from the outset (except for the probably always present air gap). Then either no stretch at all or only slight stretch occurs and the force of the clamping devices is used practically from the outset to build up sealing forces.

The inner surface at the upper marginal zone of the feed and outflow connectors respectively is circular-conical, and the external circumferential surfaces of the cones are slightly flatter than the circular-conical surfaces. The sealing surface builds up primarily beginning at the top in the feed and outflow connectors and becomes less downwards. The slight burr difference is however taken up in the plastic range of the synthetic plastics material.

The clamping devices are cap nuts. The sealing forces occur uniformly in ring form, which would not be the case if, for example, the clamping device were to consist of several circumferentially arranged toggle levers or the like single elements. Furthermore, it has appeared that it is even sufficient to tighten the cap nut by hand, and then the necessary sealing forces already occur at the initially mentioned working pressures.

The cap nuts are secured on the conduits, and the enclosing connector pipes have external threadings for the cap nuts. In unscrewing, the cap nut is outside that region from which drips could flow down and on to the cap nut, so that then the latter would have to be cleaned in such a form of embodiment.

The cap nuts have internal coarse threadings that match the external threadings of the enclosing connector pipes. Less turns are needed on the cap nut, any escaped fluid can easily be removed from the thread turns, and the coarse threading can well take up the occurring forces. This coarse threading is also suitable especially if high-grade steel is used, since this can be worked more easily with coarse threadings.

DESCRIPTION OF THE DRAWINGS

The invention will now be described by reference to a preferred embodiment. In the drawing.

Figure 1:
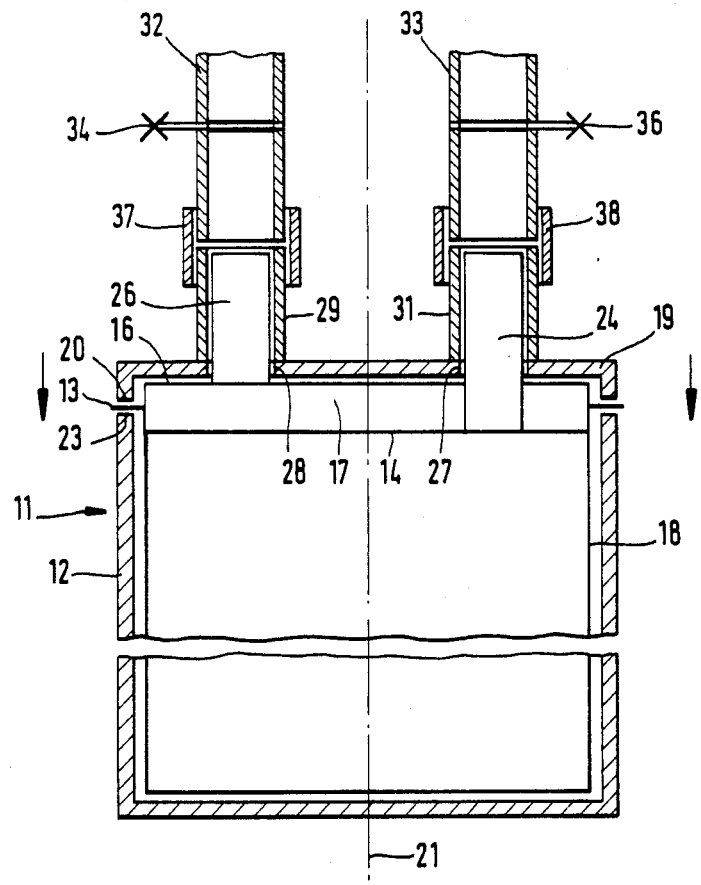
FIG. 1 shows an illustration of principle, partly in section.
Figure 2:
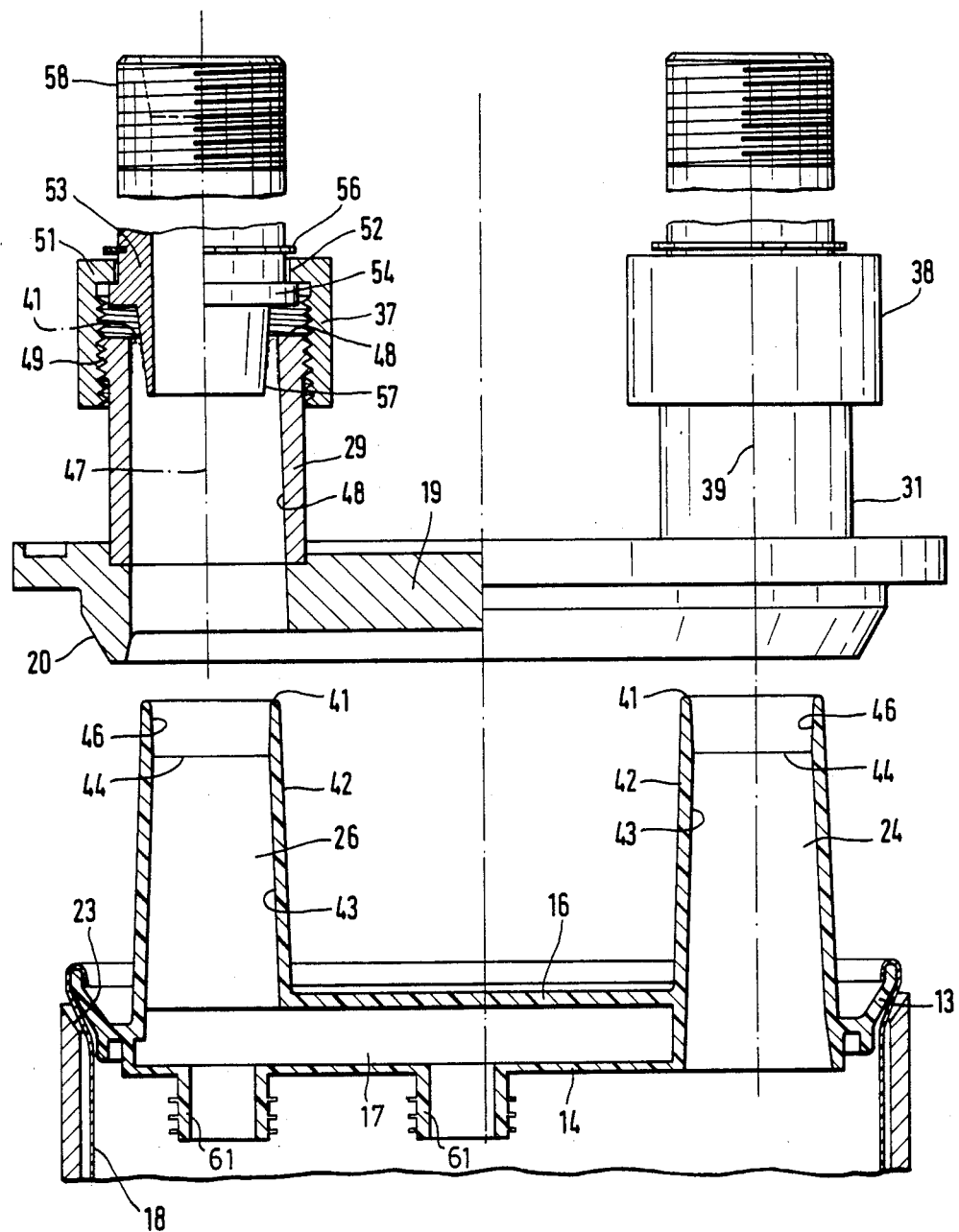
FIG. 2 shows the upper region of this arrangement, partially in section as regards the lid and its parts and the adapter/head region.

Regarding dimensional details reference is made to FIG. 2.

DETAILS OF A PREFERRED EMBODIMENT

A filter device 11 has a circular-cylindrical pot 12. On its upper edge there is seated a sealing flange 13 pertaining to an adapter 14 and a head 16. Both are in one piece of synthetic plastics material and enclose an outflow volume 17. The upper edge of a foil bag 18 is secured in media-tight manner on the adapter 14/head 16, and it is itself media-tight too. Filter cartridges (not shown) extend in the usual way down from the adapter 14 into the foil bag 18. A lid 19 of high-grade steel is likewise coaxial with the geometrical longitudinal axis 21. Its downwardly directed edge face 20 is likewise coaxial and can press from above upon the sealing flange 13 and press it in media-tight manner on to the upper edge surface 23 of the pot 12. The clamping device necessary for this purpose is not shown.

A feed connector 24 stands vertically upwards, that is parallel with the geometrical longitudinal axis 21, and communicates with the volume in the foil bag 18. An outflow connector 26 is likewise integral with the head 16, consists of synthetic plastics material, extends parallel with the geometrical longitudinal axis 21, reaches to the same height as the feed connector 24 and communicates with the outflow volume 17. Adapter 14 and head 16 are in one piece and the outflow volume 17 has no connection of any kind to the exterior, unless through the outlet connector 26.

Passage holes 27, 28 are provided in the lid 19 for the feed connector 24 and the outflow connector 26. The lid 19 extends substantially perpendicularly of the geometrical longitudinal axis 21. Upwards the passage holes merge into enclosing connector pieces 29,31 which are of high-grade steel. Above each, in continuation, there is a further conduit 32, 33. In each of these there is a cock 34, 36 which can be closed when the filter cartridges are exhausted. Cap nuts 37, 38 effect the connection between the further conduits 32, 33 for the one part and the enclosing connector pipes 29, 31 for the other part.

According to FIG. 2 the feed connector 24 is symmetrical in rotation with its geometrical longitudinal axis 39. It has a wall thickness of at least 3 mm. Its upper end face 41 is spaced by 80 mm. from the head 16. The end face 41 is rounded. Its outer surface 42 is inclined at one degree from the geometrical longitudinal axis 39, as is its inner surface 43, until it reaches an angle 44. There this surface merges into a conical surface 46 which is inclined outwards by two degrees and is rotationally symmetrical with the longitudinal axis 39. On account of this inclination, directed outwards by two degrees, the wall of the feed connector 24 becomes thinner towards the end face 41.

The outflow connector 26 is of exactly the same configuration, so that like surfaces are provided with like references.

The enclosing connector pipe 29 has a form rotationally symmetrical about the geometrical longitudinal axis 47. Its inner surface 48 is inclined inwards by one degree, so that it can support the full area of the outer surface 42. The enclosing connector pipe 29 is so high that when the lid 19 is set on the head 16 the curvatures 41 lie approximately where they are visible in FIG. 2, that is somewhat below the end face 48 of the enclosing connector piece 29.

In the upper outer end zone the enclosing connector pipe 29 has an external threading 49, formed as coarse threading. On to this the cap nut 37 can be screwed from above, the internal threading of which can be screwed on to the external threading 49. Its crown 51 has a hole 52 coaxial with the geometrical longitudinal axis 47, through which a tapered connector 53 passes. The annular collar 54 of the latter lies on the inner side of the crown 51, so that the tapered connector 53 is drawn down when the cap nut 37 is tightened. so that it is not lost upwards, a circlip 56 is situated on the tapered connector 53 close above the crown 51.

Beneath the annular collar 54 the tapered connector 53 merges externally into a circular-conical surface 57 which is coaxial with the geometrical longitudinal axis 47 and is inclined outwards and upwards at five degrees. The circular-conical surface 57 is higher than the conical surface 46, but in its effective length corresponds approximately to the length of the conical surface 46, when the cap nut 38 is in the tightened condition. Above the circlip 56 the tapered connector 53 has an external threading 58 as coarse threading for the connection of the further conduit 32.

With regard to the enclosing connector pipe 31, the tapered connector 53 with cap nut 38 is of exactly like formation.

If the lid 19 is slackened, then the air situated between the foil bag 18 and the pot 12 escapes, the foil bag 18 widens and accordingly its volume becomes greater. When the cocks 34, 36 are closed then fluid flows down out of the volumes situated beneath these cocks and the level of the fluid then in all cases stands lower than the end face 41. It has appeared that this is valid for all filter sizes. For example, naturally less air escapes in the case of smaller filters. Correspondingly, however, the volume beneath the cocks 34, 36 is also smaller, by design.

What is claimed is:

1. Device for a filter, having:
   a filter pot with an upper edge,
   an adapter with an outer marginal zone, arranged to have filter cartridges hanging therefrom,
   a media-tight foil bag surrounding said filter cartridges and abutting at least indirectly in said filter pot,
   a head arranged above said adapter,
   a sealing device arranged between said upper edge of said filter pot and said outer marginal zone of said adapter,
   outflow volume means between said adapter and said head,
   a lid arranged to fit upon said pot and said sealing device,
   an elastic feed connector extending upwards from said head and communicating with the interior of said foil bag,
   an elastic outflow connector extending upwards from said head and communicating with said outflow volume means, and
   said lid having openings through which said feed and outflow connectors pass,
   comprising the improvement wherein:
   (a) first and second vertical cylindrical enclosing connector pipes, each with an inner surface which can be subjected to circumferential stresses, extend from said lid,
   (b) said feed connector is arranged to fit in said first enclosing connector pipe and said outflow connector is arranged to fit in said second enclosing connector pipe,
   (c) a hollow cone is arranged at the end of each of a plurality of conduits, which is subjectable to pressure stresses and has an external circumferential surface that is a steep cylinder-cone frustum that fits in its narrower zone into said feed and outflow connectors, respectively,
   (d) an axially acting clamping device is arranged between each of said hollow cones and respective ones of said enclosing connector pipes,
   (e) said feed connector and said outflow connector each have an inner surface and an upper marginal zone that is adapted to be widened so far by said hollow cone that said upper marginal zone abuts in respective ones of said enclosing connector pipes, and
   (f) clamping devices are arranged to apply a force that is at least great enough to tighten the area between said hollow cones and said inner surfaces at said upper marginal zones of said feed connector and said outflow connector to a working pressure of said filter.

2. Device according to claim 1, wherein said enclosing connector pipes are of metal.

3. Device according to claim 1, wherein said inner surfaces in said upper marginal zones of said enclosing connector pipes are very steep circular-conical surfaces.

4. Device according to claim 1, wherein said feed and outflow connectors have end faces that are rounded.

5. Device according to claim 1, wherein the enclosing connector pipe associated with said feed connector has an end face and said end face of said feed connector extends at most to said end face of said enclosing connector pipe.

6. Device according to claim 1, wherein, in their unwidened condition, said upper marginal zones of said feed and outflow connectors rest on said inner surfaces of respective ones of said enclosing connector pipes.

7. Device according to claim 1, wherein said inner surface at said upper marginal zone of said feed and outflow connectors respectively is circular-conical and said external circumferential surfaces of said cones are slightly flatter than said circular-conical surfaces.

8. Device according to claim 1, wherein said clamping devices are cap nuts.

9. Device according to claim 8, wherein said cap nuts are secured on said conduits, and said enclosing connector pipes have external threadings for said cap nuts.

10. Device according to claim 9, wherein said cap nuts have internal coarse threadings that match said external threadings of said enclosing connector pipes.

11. Device according to claim 1, wherein said feed connector is of synthetic plastic material.

12. Device according to claim 11, wherein said feed connector is produced by injection-molding.

* * * * *